United States Patent
Steinau et al.

(10) Patent No.: US 8,046,377 B2
(45) Date of Patent: Oct. 25, 2011

(54) METHOD FOR CALCULATING DISTRIBUTED JOINS IN MAIN MEMORY WITH MINIMAL COMMUNICATON OVERHEAD

(75) Inventors: Oliver M. Steinau, Mannheim (DE); Jane Hartmann, Frankenthal (DE)

(73) Assignee: SAP AG, Walldorf (DE)

( * ) Notice: Subject to any disclaimer, the term of this patent is extended or adjusted under 35 U.S.C. 154(b) by 801 days.

(21) Appl. No.: 11/018,697

(22) Filed: Dec. 20, 2004

(65) Prior Publication Data
US 2006/0136388 A1   Jun. 22, 2006

(51) Int. Cl.
*G06F 7/00*   (2006.01)

(52) U.S. Cl. ...................................................... 707/770

(58) Field of Classification Search .................. 707/770, 707/999.01
See application file for complete search history.

(56) References Cited

U.S. PATENT DOCUMENTS

| | | | | |
|---|---|---|---|---|
| 4,811,207 | A * | 3/1989 | Hikita et al. ....................... | 707/2 |
| 6,003,040 | A * | 12/1999 | Mital et al. ................. | 707/103 R |
| 6,513,041 | B2 * | 1/2003 | Tarin ............................... | 707/10 |
| 6,567,802 | B1 * | 5/2003 | Popa et al. ......................... | 707/3 |

OTHER PUBLICATIONS

'Chris Holmes Online' [online]. Chris Holmes Online [retrieved on Oct. 2, 2007]. Retrieved from the Internet: <URL: http://www.chrisholmesonline.com/2007/02/03/surrogate-key-primary-key>.

* cited by examiner

*Primary Examiner* — Robert Timblin
*Assistant Examiner* — Nirav K Khakhar
(74) *Attorney, Agent, or Firm* — Mintz Levin, Cohn, Ferris, Glovsky, and Popeo P.C.

(57) ABSTRACT

A method of executing a distributed join query for a set of documents includes communication between a first server and a second server. In the first server, a first tuple list is generated from a first list of documents matching a precondition part of the query. A first set of value identifiers of attributes associated with the first list of documents is extracted from the first tuple list. A first set of dictionary keys is generated from the set of value identifiers. Then, the first set of dictionary keys is sent with a join condition attribute to a second server. In the second server, the first set of value identifiers is converted to a second set of value identifiers of attributes associated with the second server based on the set of dictionary keys. Then, a lookup of documents is performed based on the second set of value identifiers.

10 Claims, 7 Drawing Sheets

Index A:

| id$_A$ | surname | first_name | city |
|---|---|---|---|
| 1 | Miller | John | Phoenix, AZ |
| 2 | Smith | Joe | Las Vegas, NV |
| 3 | Smith | Jane | New York, NY |
| 4 | Doe | John | Cleveland, OH |
| 5 | Doe | Jane | Berkeley, CA |
| 6 | Meyer | Joe | Las Vegas, NV |
| 7 | Miller | Anne | Cleveland, OH |

Index B:

| id$_B$ | company | city |
|---|---|---|
| 1 | AA, Inc. | Berkeley, CA |
| 2 | AA, Inc. | New York, NY |
| 3 | BB & Partners | New York, NY |
| 4 | BB & Partners | Cleveland, OH |
| 5 | BB & Partners | Berkeley, CA |
| 6 | BB & Partners | Phoenix, AZ |
| 7 | CCC | Albany, NY |
| 8 | CCC | Houston, TX |
| 9 | DD, Inc. | Phoenix, AZ |

Value dictionaries for index A:

| A.surname | |
|---|---|
| $V_{A.surname}$ | value |
| 1 | Miller |
| 2 | Smith |
| 3 | Doe |
| 4 | Meyer |
| | |

| A.first_name | |
|---|---|
| $V_{A.first\_name}$ | value |
| 1 | John |
| 2 | Joe |
| 3 | Jane |
| 4 | Anne |
| | |

| A.city | |
|---|---|
| $V_{A.city}$ | value |
| 1 | Phoenix, AZ |
| 2 | Las Vegas, NV |
| 3 | New York, NY |
| 4 | Cleveland, OH |
| 5 | Berkeley, CA |

Value dictionaries for index B:

| B.company | |
|---|---|
| $V_{B.company}$ | value |
| 1 | AA, Inc. |
| 2 | BB & Partners |
| 3 | CCC |
| 4 | DD, Inc. |
| | |

| B.city | |
|---|---|
| $V_{B.city}$ | value |
| 1 | Berkeley, CA |
| 2 | New York, NY |
| 3 | Cleveland, OH |
| 4 | Phoenix, AZ |
| 5 | Albany, NY |
| 6 | Houston, TX |

FIG. 2B

Index A:

| $id_A$ | $V_{A.surname}$ | $V_{A.first\_name}$ | $V_{A.city}$ |
|---|---|---|---|
| 1 | 1 | 1 | 1 |
| 2 | 2 | 2 | 2 |
| 3 | 2 | 3 | 3 |
| 4 | 3 | 1 | 4 |
| 5 | 3 | 3 | 5 |
| 6 | 4 | 2 | 2 |
| 7 | 1 | 4 | 4 |

Index B:

| $id_B$ | $V_{B.company}$ | $V_{B.city}$ |
|---|---|---|
| 1 | 1 | 1 |
| 2 | 1 | 2 |
| 3 | 2 | 2 |
| 4 | 2 | 3 |
| 5 | 2 | 1 |
| 6 | 2 | 4 |
| 7 | 3 | 5 |
| 8 | 3 | 6 |
| 9 | 4 | 4 |

| id$_A$ | id$_B$ | A.surname | A.first_name | B.company |
|---|---|---|---|---|
| 1 | 6 | Miller | John | BB & P. |
| 1 | 9 | Miller | John | DD, Inc. |
| 3 | 2 | Smith | Jane | AA, Inc. |
| 3 | 3 | Smith | Jane | BB & P. |
| 4 | 4 | Doe | John | BB & P. |
| 5 | 1 | Doe | Jane | AA, Inc. |
| 5 | 5 | Doe | Jane | BB & P. |
| 7 | 4 | Miller | Anne | BB & P. |

704: [$id_A$, $V_{A.city}$]

| $id_A$ | $V_{A.city}$ |
|---|---|
| 1 | 1 |
| 2 | 2 |
| 3 | 3 |
| 4 | 4 |
| 5 | 5 |
| 6 | 2 |
| 7 | 4 |

(B)

706: uniq([$V_{A.city}$])

| |
|---|
| 1 |
| 2 |
| 3 |
| 4 |
| 5 |

(C)

708: [$V_{A.city}$] → [$V_{B.city}$]

| $V_{A.city}$ | $V_{B.city}$ |
|---|---|
| 1 | 4 |
| 3 | 2 |
| 4 | 3 |
| 5 | 1 |

(D)

710: [$id_B$, $V_{B.city}$] for all values for $V_{B.city}$ from the list generated at 708

| $id_B$ | $V_{B.city}$ |
|---|---|
| 1 | 1 |
| 2 | 2 |
| 3 | 2 |
| 4 | 3 |
| 5 | 1 |
| 6 | 4 |
| 9 | 4 |

(E)

710: converted to [$id_B$, $V_{A.city}$]

| $id_B$ | $V_{A.city}$ |
|---|---|
| 1 | 5 |
| 2 | 3 |
| 3 | 3 |
| 4 | 4 |
| 5 | 5 |
| 6 | 1 |
| 9 | 1 |

FIG. 6

(F) 712: uniq([$V_{A.city}$])

| |
|---|
| 1 |
| 3 |
| 4 |
| 5 |

(G) 714: [$id_A$, $V_{A.city}$], after those $V_{A.city}$ have been removed

| $id_A$ | $V_{A.city}$ |
|---|---|
| 1 | 1 |
| 3 | 3 |
| 4 | 4 |
| 5 | 5 |
| 7 | 4 |

(H) 716: lists [$id_A$, $V_{A.city}$] retrieved from server A and [$V_{A.city}$, $id_B$] retrieved from server B:

| $id_A$ | $V_{A.city}$ | $V_{A.city}$ | $id_B$ |
|---|---|---|---|
| 1 | 1 | 5 | 1 |
| 3 | 3 | 3 | 2 |
| 4 | 4 | 3 | 3 |
| 5 | 5 | 4 | 4 |
| 7 | 4 | 5 | 5 |
| | | 1 | 6 |
| | | 1 | 9 |

(I) 716: resulting list [$id_A$, $id_B$] generated by combining the two lists by $V_{A.city}$

| $id_A$ | $id_B$ |
|---|---|
| 1 | 6 |
| 1 | 9 |
| 3 | 2 |
| 3 | 3 |
| 4 | 4 |
| 5 | 1 |
| 5 | 5 |
| 7 | 4 |

FIG. 6 (CONT.)

METHOD FOR CALCULATING DISTRIBUTED JOINS IN MAIN MEMORY WITH MINIMAL COMMUNICATON OVERHEAD

BACKGROUND

An index is an ordered collection of numbers or character strings, or both, such that some numbers or character strings represent objects and other numbers or character strings represent information about these objects. For example, one form of index can be viewed as a table whose rows represent documents and whose columns represent attributes of these documents. Such a column in a table T can be referred to as T.attribute.

Figure 1:
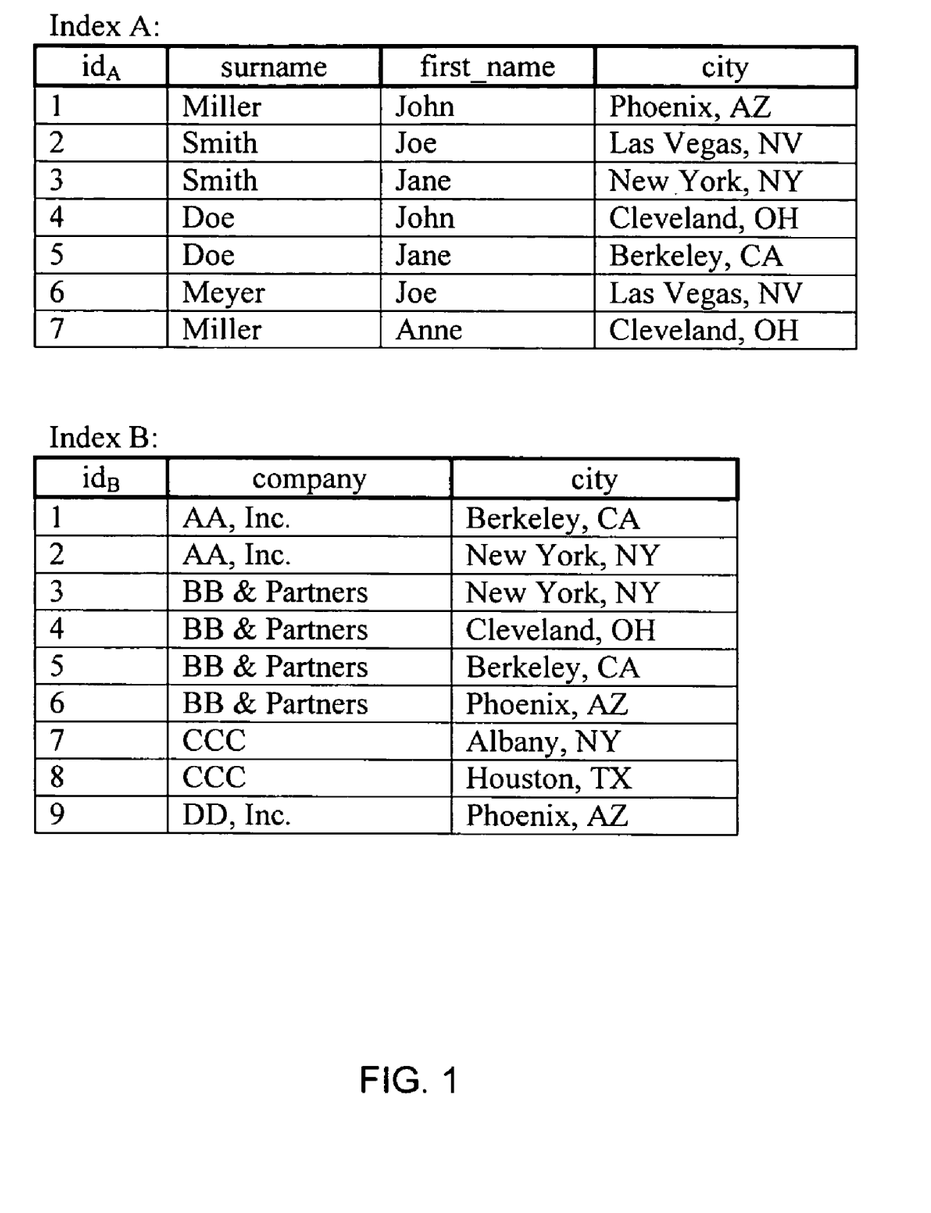
FIG. 1 illustrates two index tables.
Figure 3:
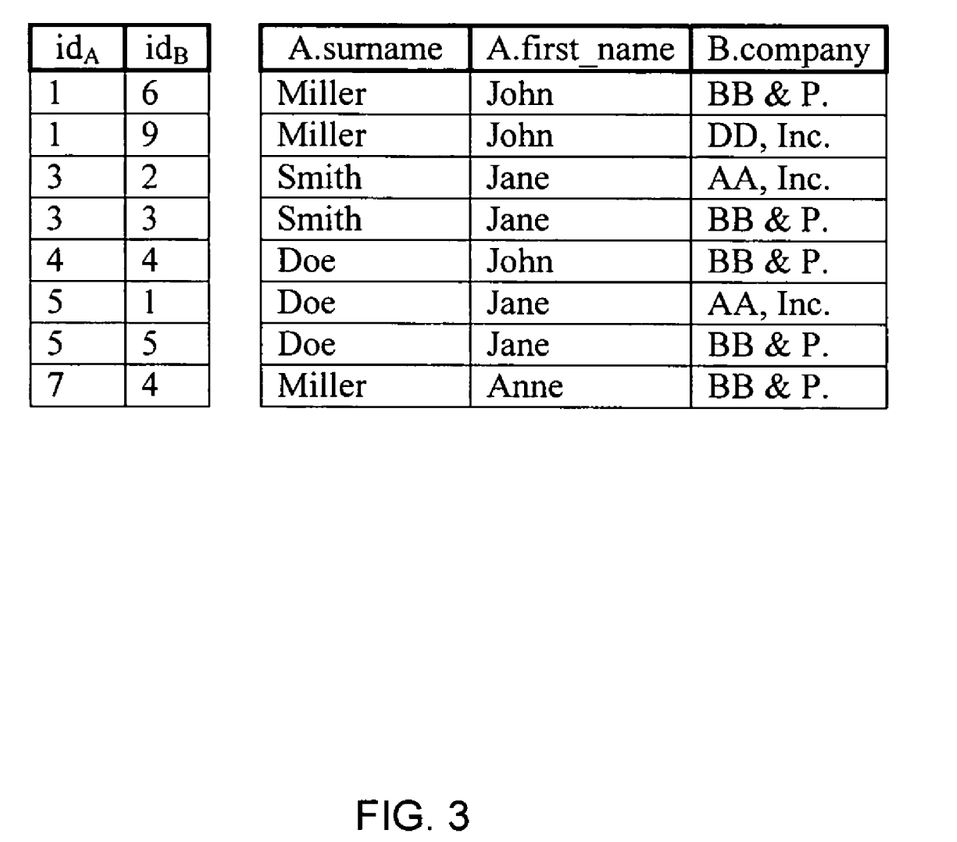
FIG. 3 illustrates the resulting table after performing a join query on these indexes.

Joins are a class of data-processing operations that may be performed on indexes. Joins are used to match documents from different indexes by finding matching values of certain attributes of these documents. As an illustrative example, FIG. 1 shows two indexes A and B. In index A, documents represent customers and their attributes are surname, first name, and city. In index B, documents represent suppliers of certain goods and their attributes are company name and city. From indexes A and B, a table listing customers and companies in their home towns can be created. That is, the following SQL-like "join query" is evaluated:
SELECT A.surname, A.first_name, B.company FROM A, B where A.city=B.city To evaluate this join, these two indexes are joined by join attributes A.city and B.city. The corresponding documents from the two indexes are merged by matching their values of the join attributes. This yields the table of values shown in FIG. 3.

Consider a distributed landscape in which indexes are hosted on separate machines. One problem is that the amount of network traffic required to compute such a distributed join may be the main factor limiting the performance achievable with a given join process. Conventional processes for computing the join may require network traffic proportional to the size of the join table. If, for two indexes, one index has N rows and the other index has M rows, then the join table may consist of as many as N*M rows, and has all the requested attributes from both tables.

The problem is exacerbated in situations where indexes are too large for a single machine. Such indexes may be split up and stored on different servers. To process join queries over such distributed indexes, it may be necessary to transfer even more data over the network than in the case where each index has its own host. What is needed is a join method that minimizes network traffic.

SUMMARY

This document presents methods and systems for calculating distributed joins, and for accelerating the execution of join queries in a distributed network landscape where the relevant indexes are stored on different hosts. The disclosed techniques minimize the amount of network traffic required. The methods and systems offer the benefits that only relatively small lists of integer values are transferred over the network, and value dictionaries from different indexes are fetched only once.

In one embodiment, a method of executing a distributed join query for a set of documents includes communication between a first server and a second server. In the first server, the method includes generating a first tuple list from a first list of documents matching at least part of the query, and extracting, from the first tuple list, a first set of value identifiers of attributes associated with the first list of documents. The method further includes generating a first set of dictionary keys from the set of value identifiers, and sending the first set of dictionary keys with a join condition attribute to a second server. In the second server, the method includes converting the first set of value identifiers to a second set of value identifiers of attributes associated with the second server based on the set of dictionary keys, and performing a lookup of documents based on the second set of value identifiers.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

FIGS. 6A-6I illustrate results of the method shown in FIG. 4 for a specific query.

Like reference symbols in the various drawings indicate like elements.

DETAILED DESCRIPTION

Figure 2A:
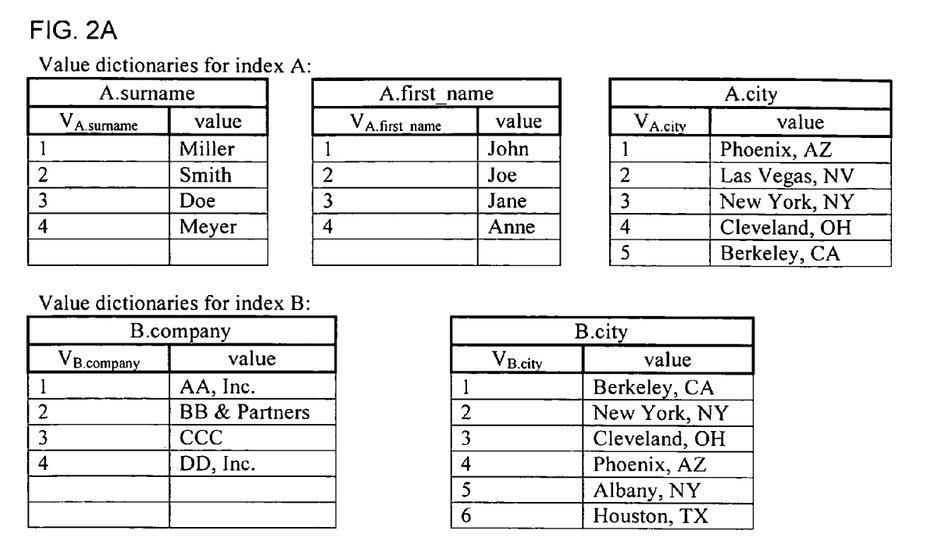
FIGS. 2A and 2B illustrate the use of value dictionaries and the concept of value IDs.
Figure 2B:
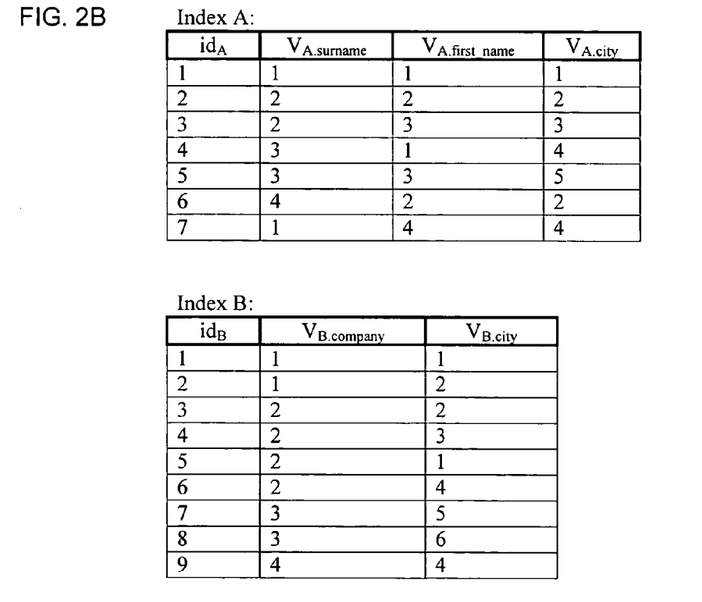

A method for matching documents in a distributed data processing system is presented. The method includes a technique for calculating distributed joins for matching documents that minimizes the amount of network traffic required. In accordance with an embodiment, attribute values for a document are stored in a dictionary, as shown in FIG. 2A. The dictionary is stored separately from any index that contains the corresponding attribute as a column. Such an index contains only the dictionary keys (referred to as "value IDs") for the respective documents in the attribute columns. The value IDs are integer numbers that take much less space than the (possibly repeated) attribute values themselves. FIG. 2B illustrates the storage of dictionary keys in attribute columns.

Equi-joins are a special type of join in which join attributes are compared for equality (i.e., "A.x=B.y"). For the sake of simplicity, only equi-joins are described herein. Provided that the value dictionaries are constructed such that the values are in ascending order before the keys are assigned (so that k1<k2 if v1<v2 for any two key/value pairs k1/v1 and k2/v2), those types of joins that involve comparing the join attributes using operators "not equal", "less than", etc. (e.g. "A.x<B.x" or "A.x>=B.x") can also be evaluated using methods described herein, such as in steps 410, 506 and 506 described below. The relevant indexes should remain unmodified while an executed query is in progress. For each attribute used as a join attribute, there is a corresponding value dictionary, as described above, and joins are AND-connected to the other query parts. In an exemplary embodiment, each of the relevant indexes resides on a different index server A, B, C, . . . etc., and the final result is created on the logical server L.

Attributes within an index are denoted as follows: Attribute x in index A is A.x, attribute y in index B is B.y . . . etc.

Documents within an index are uniquely identified by internal document IDs: $id_A$, $id_B$, ... which denote the document IDs of indexes A, B, ... etc. Each dictionary key in a value dictionary is a value ID: for example, $V_{A.x}$ denotes the value ID of attribute x in index A. Square brackets denote a list of values as follows: $[id_A]$ stands for a list of document IDs from index A, for example. Square brackets enclosing multiple values denote tuples of values: $[id_A, id_B, id_C]$ denotes a list of ordered triples (3-tuples) of document IDs from indexes A, B, and C, respectively. The elements can be reordered at no cost; for example, the tuple list [a, b] is obtained from [b, a] by swapping the columns.

The function $[V_{A.x}] \rightarrow [V_{B.y}]$ converts value IDs for attribute A.x to value IDs for attribute B.y, using the respective value dictionaries. Value IDs from A.x that correspond to values missing in value dictionary for B.y are discarded. The function uniq(x) takes as its argument a list of values and removes from this list all duplicates, so that only unique values are present in the result. The function rfl(a, b) takes two lists as arguments and removes from list <a> those entries that are not present in list <b>. If one or both of these lists are tuples, then the lists are compared on the basis of the values in the respective first elements of the tuples.

Figure 4:
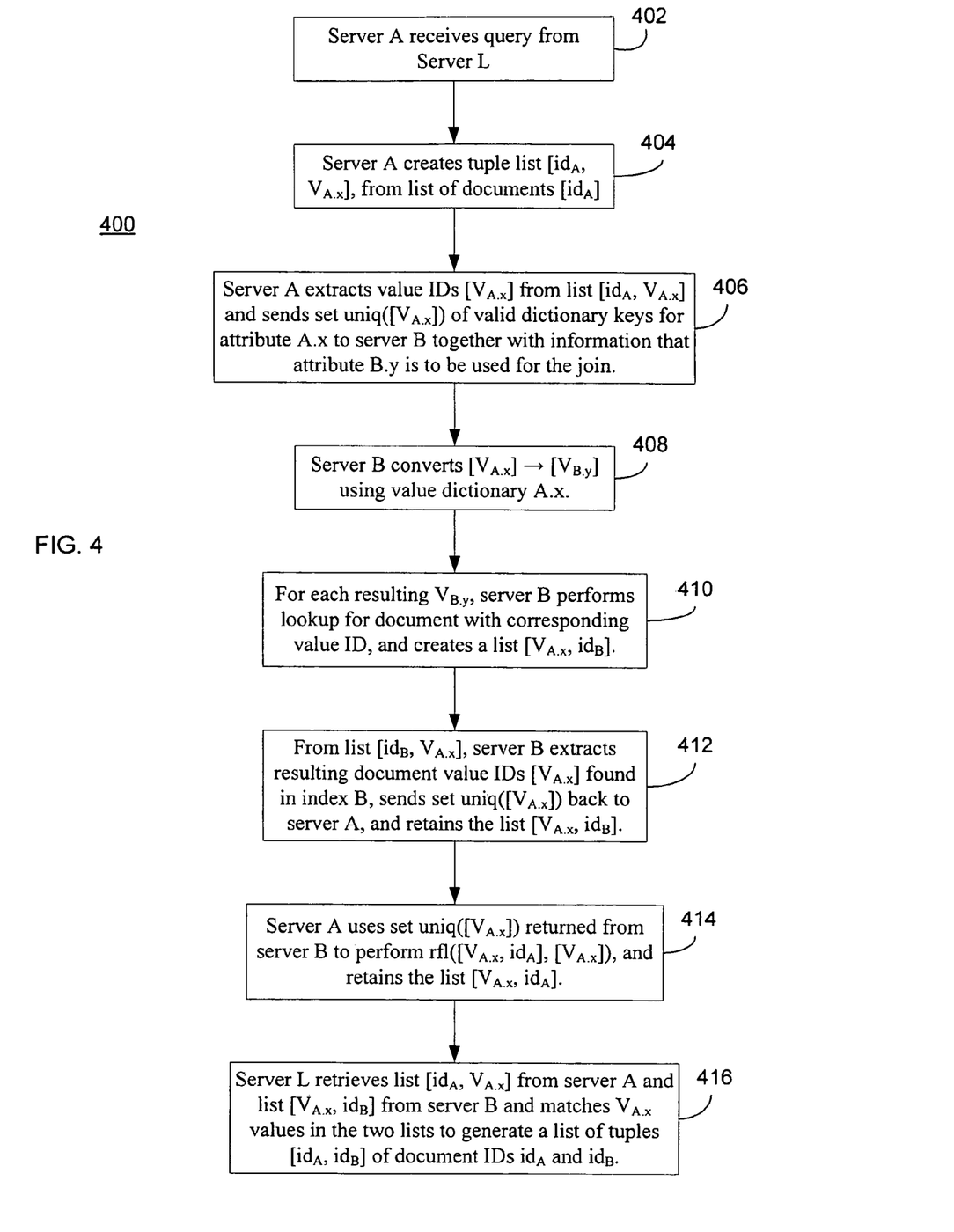
FIG. 4 is a flowchart of a method for executing a distributed join query between two indexes.
Figure 6:
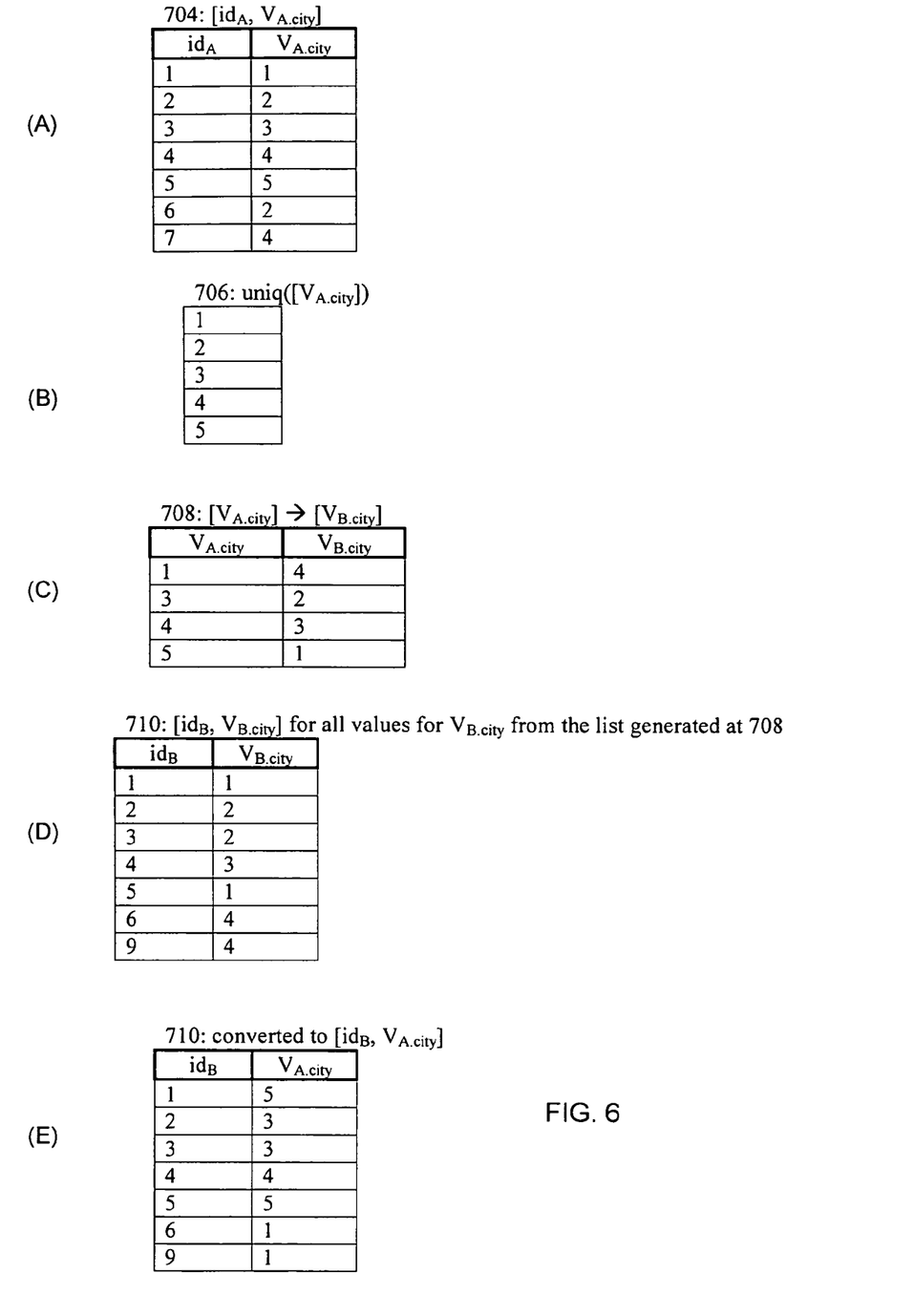

FIG. 4 is a flowchart of a method 400 for executing a join query between two index servers in a distributed server landscape. The query in method 400 is "A.x=B.y". The intermediate results of method 400 when applied to the sample index in FIG. 1 using the query "A.city=B.city" are graphically illustrated in FIG. 6. Evaluating the "=" part is accomplished as follows: A sends the value IDs to B, B sends those values back for which there was a match, and A removes from its list the values that were not found. After this, there are two lists which, when combined, yield a list of tuples of document IDs from A and B where the corresponding A.x's and B.y's match. To evaluate the query, the following steps are performed: at 402 server L sends the query part "A.x=B.y" to server A. At 404 server A generates a list $[id_A]$ of all documents (FIG. 6A). From this list, server A creates the tuple list $[id_A, V_{A.x}]$. At 406 (FIG. 6B) server A extracts the value IDs $[V_{A.x}]$ from this list and sends the set uniq($[V_{A.x}]$) of valid dictionary keys for attribute A.x to server B together with the information that attribute B.y is to be used for the join.

Server B performs the conversion $[V_{A.x}] \rightarrow [V_{B.y}]$ using the value dictionary of A.x, at 408 (FIG. 6C). For each resulting $V_{B.y}$, at 410 (FIG. 6D) server B performs a lookup for the corresponding documents (the ones with this value ID), creates a list $[id_B, V_{B.y}]$, and converts it to a list $[id_B, V_{A.x}]$ using the value dictionary of A.x (FIG. 6E). From this list $[id_B, V_{A.x}]$, at 412 (FIG. 6F) server B extracts the resulting value IDs $[V_{A.x}]$ (these are the values for which documents were found in index B), and sends the set uniq($[V_{A.x}]$) back to server A. Server B retains the list $[V_{A.x}, id_B]$.

At 414 (FIG. 6G), server A uses the set uniq($[V_{A.x}]$) returned from server B to perform rfl($[V_{A.x}, id_A]$, $[V_{A.x}]$), thereby removing from the list $[V_{A.x}, id_A]$ those documents for which no corresponding documents were found in index B. Server A retains the resulting list $[V_{A.x}, id_A]$. At 416 (FIG. 6H), server L retrieves list $[id_A, V_{A.x}]$ from server A and list $[V_{A.x}, id_B]$ from server B and matches the $V_{A.x}$ values in the two lists to generate a list of tuples $[id_A, id_B]$ of document IDs $id_A$ and $id_B$ (FIG. 6I). This finds all the documents whose requested attributes are to be returned as the result of the join query.

Figure 5:
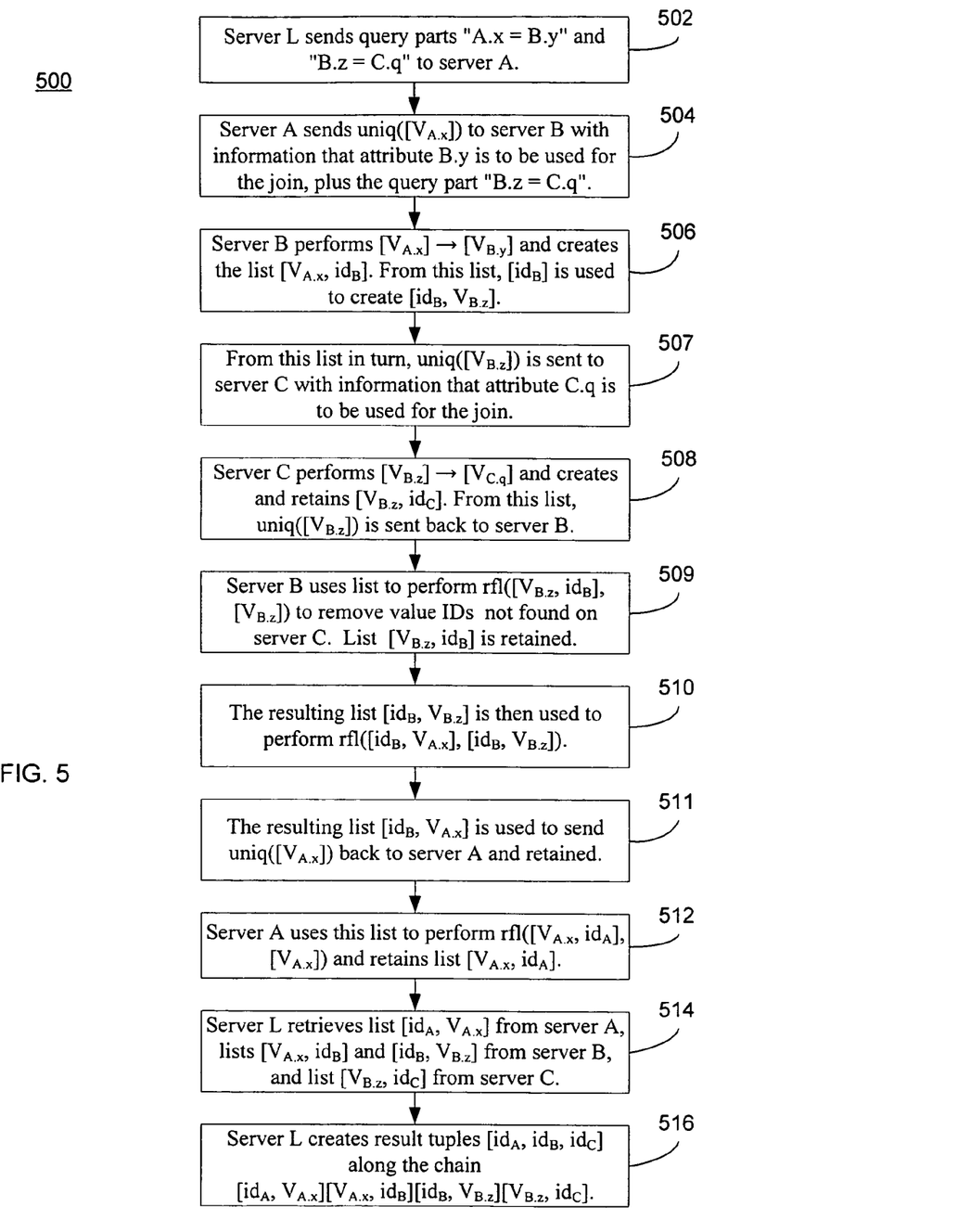
FIG. 5 is a flowchart of a method for executing a distributed join query between three indexes.

FIG. 5 extends the method above to more complex queries involving AND operators between the join parts. That is, in a query "A.x=B.y AND B.z=C.q," the parts "A.x=B.y" and "B.z=C.q" are evaluated as outlined in FIG. 4. The results are then combined with AND. The "intermediate" result of evaluating the complete join query is a list of tuples of document IDs $[id_A, id_B, id_C]$ which satisfy the given query (and for which the requested attributes are later retrieved). Thus, as a further example, consider a join query that refers to more than two indexes: SELECT A.a, B.b, C.c FROM A, B, C WHERE A.x=B.y AND B.z=C.q. In this example, it can be assumed that a query execution plan has been created, and that the parts of the query are to be executed in the order given in the query.

FIG. 5 is a flowchart of a method 500 for executing a join query in a distributed server landscape having more than two index servers. At 502, server L sends the query parts "A.x=B.y" and "B.z=C.q" to server A. At 504, server A sends uniq($[V_{A.x}]$) to server B together with the information that attribute B.y is to be used for the join, plus the query part "B.z=C.q". At 506, server B performs $[V_{A.x}] \rightarrow [V_{B.y}]$ and creates the list $[V_{A.x}, id_B]$. At 507, $[id_B]$ from this list is used to create $[id_B, V_{B.z}]$. From this list, uniq($[V_{B.z}]$) is in turn sent to server C together with the information that attribute C.q is to be used for the join.

At 508, server C performs $[V_{B.z}] \rightarrow [V_{c.q}]$ and creates and retains $[V_{B.z}, id_C]$. From this list, uniq($[V_{B.z}]$) is sent back to server B. At 509, server B uses this list to perform rfl($[V_{B.z}, id_B]$, $[V_{B.z}]$) to remove the value IDs that were not found on server C. The resulting $[V_{B.z}, id_B]$ is then used at 510 to perform rfl($[id_B, V_{A.x}]$, $[id_B, V_{B.z}]$). Steps 507 through 510 are repeated (properly substituting the indexes and attributes) when queries with more indexes are to be evaluated.

At 511, the resulting list $[id_B, V_{A.x}]$ is used to send uniq($[V_{A.x}]$) back to server A. $[V_{A.x}, id_B]$ and $[id_B, V_{B.z}]$ are retained. At 512, server A uses this list to perform rfl($[V_{A.x}, id_A]$, $[V_{A.x}]$) and retains the list $[V_{A.x}, id_A]$. To assemble the final result, at 514 server L retrieves list $[id_A, V_{A.x}]$ from server A, lists $[V_{A.x}, id_B]$ and $[id_B, V_{B.z}]$ from server B, and list $[V_{B.z}, id_C]$ from server C. From these lists, server L creates the result tuples $[id_A, id_B, id_C]$ along the chain $[id_A, V_{A.x}][V_{A.x}, id_B][id_B, V_{B.z}][V_{B.z}, id_C]$ at 516. Server L then retrieves the requested attributes A.a, B.b, and C.c from the respective indexes using the document Ids created in step 516.

Only relatively small lists of integer values are transferred over the network, such as $[V_{A.x}]$, $[id_A, V_{A.x}]$, ... etc. Value dictionaries from different indexes are fetched only once. They may then be retained locally (ideally in a least-recently-used (LRU) cache to limit the amount of memory used).

Although a few embodiments have been described in detail above, other modifications are possible. The sequential order of execution shown in FIGS. 4 and 5 are merely for clarity, and some operations may be performed in parallel, which is within the scope of the following claims.

The invention claimed is:

1. A method comprising:
executing a distributed equi-join query for a set of documents, each document of the set of documents comprising an index identifier for each row of the document, each row of the document including one or more values for associating one or more first attributes represented in columns of the document, the execution comprising for each document in the set of documents:
in a first server:
generating a first tuple list of documents, the first tuple list including an index identifier for each row of the first tuple list, the each row of the first tuple list including a first set of value identifiers that represent values for one or more attributes represented in the columns of the first document;

extracting, from the first tuple list, a first subset of value identifiers by removing duplicate occurrences of value identifiers from the first set of value identifiers; and sending the first subset of value identifiers with a join condition attribute to a second server; and in the second server:

mapping the first subset of value identifiers to a second subset of value identifiers of second attributes represented in columns of a second document of the set of documents based on a dictionary of value identifiers and their associated values in the first server, the second set of value identifiers represented with corresponding index identifiers in a second tuple list; and performing a lookup in the second tuple list to obtain results that generate a third tuple list including the mapped portion of the second set of value identifiers with corresponding index identifiers in the second tuple list.

2. A method in accordance with claim 1, wherein performing a lookup by the second server further comprises:

generating, using the mapping, a fourth tuple list from the third tuple list, the fourth tuple list index at least a portion of index identifiers of the second document and at least a portion of the value identifiers of the first tuple list.

3. A method in accordance with claim 2, further comprising:

extracting, at the second server, unique value identifiers from the fourth tuple list; and sending, by the second server, the unique value identifiers to the first server.

4. A method in accordance with claim 3, further comprising, in the first server:

generating, using the unique value identifiers, a fifth tuple list, wherein the fifth tuple list includes the unique value identifiers, and index identifiers in the first tuple list that correspond to the unique value identifiers.

5. A method in accordance with claim 4, further comprising, in a third server:

retrieving the fourth tuple list from the second server and the fifth tuple list from the first server; and generating, using the fourth tuple list and the fifth tuple list, a sixth tuple list that maps the index identifiers of the fourth tuple list to the index identifiers of the fifth tuple list.

6. A system for executing a distributed equi-join query for a set of documents, wherein the query includes a precondition part and a join condition part, the system comprising one or more processors configured to provide:

a first logical server having a processor under command of program code, the program code including code for:

generating a first tuple list of documents matching the precondition part of the query, the first tuple list including an index identifier for each row of the first tuple list, each row of the first tuple list including a first set of value identifiers that represent values for one or more attributes represented in the columns of the first document;

extracting, from the first tuple list, a first subset of value identifiers by removing duplicate occurrences of value identifiers from the first set of value identifiers;

sending the first subset of value identifiers with a join condition attribute to a second index server; and the second index server having a processor under command of program code including code for:

mapping the first subset of value identifiers to a second subset of value identifiers of second attributes represented in columns of a second document of the set of documents based on a dictionary of value identifiers and their associated values in the first server, the second set of value identifiers represented with corresponding index identifiers in a second tuple list; and performing a lookup in the second tuple list to obtain results that generate a third tuple list including the mapped portion of the second set of value identifiers with corresponding index identifiers in the second tuple list.

7. A system in accordance with claim 6, wherein the logical server is configured to combine the results from the first and second index servers into a final result of the query.

8. A system in accordance with claim 7, wherein the logical server is further configured to retrieve documents from the first and second index servers according to the final result.

9. A first server configured to perform operations comprising one or more processors configured for:

receiving at the first server data characterizing a query involving an equi-join operation, the data received from a second server;

generating a first list of unique value identifiers for records matching the query, the first list of unique value identifiers including value identifiers of an attribute of a join condition specified in the query, the value identifiers including an index identifier for each row of the first list of unique value identifiers, each row of the first tuple list including a first set of value identifiers that represent values for one or more attributes represented in the columns of the first document;

transmitting the first list of unique value identifiers to a third server;

receiving at the first server data characterizing a second list of unique value identifiers being a subset of the first list of unique value identifiers that correspond to only those value identifiers from the first list that correspond to attributes that are in records of the third server;

generating a first list of records that both match the query and include a value identifier from the second list of unique value identifiers; and transmitting the first list of records to the second server, the second server to join the first list of records with a second list of records from the third server having an attribute corresponding to a value identifier from the second list of unique value identifiers.

10. A first server configured in accordance with claim 9, wherein:

the first list of unique value identifiers represent attribute values of an attribute in a database data structure of the first server according to a first scheme of dictionary-based compression and the third server represents the attributes of the first list of unique value identifiers according to a second scheme of dictionary-based compression that differs from the first scheme and the third server maps value identifiers of the first scheme to value identifiers of the second scheme to generate the second list of unique value identifiers.

* * * * *